United States Patent [19]

Ran

[11] Patent Number: 5,768,533

[45] Date of Patent: Jun. 16, 1998

[54] VIDEO CODING USING SEGMENTED FRAMES AND RETRANSMISSION TO OVERCOME CHANNEL ERRORS

[75] Inventor: Xiaonong Ran, Cupertino, Calif.

[73] Assignee: National Semiconductor Corporation, Santa Clara, Calif.

[21] Appl. No.: 522,688

[22] Filed: Sep. 1, 1995

[51] Int. Cl.$^6$ .................................................. G01D 1/16
[52] U.S. Cl. ................................. 395/200.77; 395/181
[58] Field of Search ........................ 364/514 R, 715.02; 371/32, 34, 37.1, 37.7, 38.1, 39.1, 40.2, 41, 48, 55; 395/181, 182.04, 182.16, 182.19, 185.01, 185.05, 200.77; 382/309; 341/94

[56] References Cited

U.S. PATENT DOCUMENTS

| Re. 31,182 | 3/1983 | Crager et al. | 178/3 |
|---|---|---|---|
| 4,829,524 | 5/1989 | Yoshida | 371/32 |
| 5,105,423 | 4/1992 | Tanaka et al. | 371/5.5 |
| 5,481,566 | 1/1996 | Kulesa | 375/259 |

OTHER PUBLICATIONS

Goodman, D. et al., "Combined Source and Channel Coding for Variable-Bit-Rate Speech Transmission", 62 *The Bell System Technical Journal* 2017–2035 (1983).

*Primary Examiner*—James P. Trammell
*Assistant Examiner*—Thomas Peeso
*Attorney, Agent, or Firm*—Skjerven, Morrill, MacPherson, Franklin & Friel; Edward C. Kwok; David T. Millers

[57] ABSTRACT

A communication system and protocol uses retransmission techniques for video transmission on mobile/wireless channels. The system partitions frames of a moving image into frame segments, and combines a sequence of frame segments to form a sub-sequence of the moving image. The sub-sequences are treated as separate images which are separately encoded and transmitted to a receiver and then are combined to reassemble the moving image. A sender transmits to the receiver data packets, each data packet representing all or part of a digital code for a frame segment. The receiver requests retransmission of data packets containing detectable errors, indicates in a status buffer which digital codes have been received and whether the digital codes are intra or inter codes, and displays a frame only after all required data packets have been received without detectable errors. The segmented frames limit occasional failures to accurately retransmit data to individual sub-sequences, so that the failure to accurately transmit data is compensated for by subsequent transmission an intra coded digital code for a frame segment.

21 Claims, 2 Drawing Sheets

VIDEO CODING USING SEGMENTED FRAMES AND RETRANSMISSION TO OVERCOME CHANNEL ERRORS

BACKGROUND OF THE INVENTION

1. Field of the Invention

This invention relates generally to coding, transmission, and display of video in telecommunication systems having bursty channel errors and in particular relates to mobile/wireless videophone systems.

2. Description of Related Art

Digital mobile/wireless telephones use mobile/wireless channels to transmit digital signals representing audio. Such signals are normally in the form of packets. More specifically, a sender transmits a signal representing packets of digital audio data where each packet represents 30 ms of audio; and a receiver decodes one packet every 30 ms to maintain continuous audio output. However, channel (or transmission) errors in the data packets can be as many as one bit in $10^3$ to $10^2$ which can interfere with the decoding process. Typically, channel errors for mobile/wireless telephone channels tend to be bursty, that is the errors occur in bursts or groups that are clumped together. Such burst of errors may correspond to events such as an object becoming temporarily interposed between the sender and receiver. To correct for the channel errors, the packets contain error correction codes (ECCs) with which the receiver attempts to correct the errors.

In some other types of data transmission systems, a receiver which detects errors in a data packet from a sender requests that the sender retransmit the data packet. A variety of retransmission strategies are available and include basic automatic repeat request (ARQ) and hybrid ARQ protocols. Examples of ARQ systems are described in "Error Control Coding: Fundamentals and Applications", by Shu Lin and Daniel J. Costello, Jr., copyright by Prentice-Hall, Inc. (1983) which is incorporated herein by reference in its entirety.

Retransmission is typically not used for mobile/wireless telephones because retransmission introduces unacceptable delay jitter into the audio. For instance, a receiver must receive packets representing 30 ms of audio at a rate of one per 30 ms. Otherwise, skips and breaks appear in the audio. Buffering or temporarily storing data packets in the receiver allows some flexibility in the timing of the data packets, but buffering delays generation of audio from the packet. If the delay is too large, it becomes noticeable to users and changes the pattern of telephone conversations. If the delay is small enough not to be noticed, there is insufficient time to allow the receiver to request and receive a retransmitted data packet before the data is needed for audio generation, especially if a data packet must be retransmitted more than once before being received without errors.

Accordingly, instead of retransmission, mobile/wireless telephones have used techniques such as algebraic error control coding for correction of channel errors and equal/unequal error protection coding to provide more error correction coding for the most critical data. With the error correction coding, retransmission is not required, and delay jitter caused by retransmission is avoided. Errors which cannot be corrected from the error correction codes cause static which is acceptable for most communications.

Recently, systems have been proposed for digital mobile/wireless videophones wherein a sender transmits signals representing both audio and video. The systems have included error correction coding for video which is similar to the error correction coding used in mobile/wireless telephones. However, errors in video data which cannot be corrected by algebraic error correction result in video displayed with flawed areas containing incorrect colors and/or intensities. These flawed areas can be very noticeable and distracting. Additionally many of the most efficient video compression processes use encoding commonly referred to as "inter" coding. Inter coding encodes changes between successive frames of a moving image, and the receiver adds the inter coded data to data from a previous frame to determine a current frame of the moving image. Unfortunately, with inter coding, new inter coded data builds new frames on frames containing flaws, and the receiver may preserve and repeat flaws caused by an uncorrectable error. Further, uncorrectable errors can accumulate from several frames, resulting in poor image quality. Avoiding inter coding can prevent accumulation of flaws but typically decreases compression efficiency which decreases maximum frame rate and/or image quality. Accordingly, a system is needed which eliminates the flawed areas displayed by videophones and permits use of inter coding.

SUMMARY OF THE INVENTION

In accordance with the invention, a communication system such as a videophone system uses retransmission to correct channel errors in signals representing a moving image. Each frame of the moving image is displayed only after all necessary data for the frame has been received without errors that are detectable by a receiver. Accordingly, each frame of the moving image is displayed without flaws that commonly appear in systems using algebraic error correction.

In one embodiment of the invention, a moving image is spatially partitioned into sub-sequences which are sequences of frames segments, each frame segment being part of a frame of the moving image. Sub-sequences are encoded separately so that channel errors in one sub-sequence do not affect other sub-sequences. Typically, a sender inter codes frame segments for the sub-sequences and transmits digital codes representing the frame segments to a receiver. The receiver requests retransmission when an error is detected in a digital code representing a frame segment. However, if retransmission fails to provide error-free data for the frame segment in time for decoding, a subsequent frame segment in the sub-sequence is intra coded so that the data which could not be accurately transmitted is no longer necessary. Dividing the moving image into sub-sequences reduces the required intra coded data from an entire frame to a frame segment, and therefore improves average compression efficiency.

To reduce the amount of data affected by a burst of channel errors, each digital code representing a frame segment in a sub-sequence is divided into data packets which have a length dynamically set according to an error rate on a transmission channel. Typically, the length is set so that the chance of transmitting the packet without error is sufficiently high. In addition to dynamically setting the packet length according to an error pattern on the channel, the frame rate and quantization steps size used for encoding the moving image can be dynamically adjusted to provide maximum frame rate and image quality for the effective capacity of the channel.

To determine when a frame is ready for display, the receiver contains a status buffer which contains entries corresponding to the frame segments in several consecutive frames. Each entry indicates whether a digital code for a frame segment has been received without errors and indicates whether the frame segment is inter or intra coded. A frame segment is considered displayable if the frame segment is intra coded and the code for the frame segment has been received without errors or if the frame segment is inter coded, the code for the frame segment has been received without errors, and the preceding frame segment in the same sub-sequence is displayable. A frame is displayable if all the frame segments in the frame are displayable. The receiver only displays the most recent displayable frame. Accordingly, some frames may be skipped which decreases the frame rate in the moving image. However, frame rate variation is less noticeable than the frame quality degradation common in other systems.

In accordance with another aspect of the invention, the sender contains status counters which correspond to the sub-sequences. The status counters contain counts indicating the number of times that frame segments in the sub-sequences have been inter coded. If any count exceeds a threshold, the next frame segment for the sub-sequence corresponding to the count is intra coded. This refreshes the data in the receiver and removes any flaws in the moving image caused by previous undetected channel errors.

DETAILED DESCRIPTION OF THE PREFERRED EMBODIMENTS

In accordance with an embodiment of the invention, a communications system includes a sender which transmits a series of video data packets to a receiver. The packets represent a sequence of frames which form a moving image. The receiver collects the packets from the sender and checks the packets for errors. When a packet is received without errors, the receiver sets an entry in a video status buffer to indicate that a packet for a particular portion of a frame is ready. When the receiver detects an error, the receiver requests that the sender retransmit the packet which contained the error.

The sender, in response to a retransmission request, immediately inserts the retransmitted video data packet into the series of packets transmitted to the receiver. Accordingly, the series of data packets may mix video data from different frames, and the video status buffer in the receiver contains entries for several frames to track data packets for the different frames. When entries in the video status buffer indicate all data needed for a frame has been received without errors, the frame is "displayable", i.e. ready to be decoded and/or displayed. The receiver periodically checks the video status buffer to determine if any frames are displayable. If one or more is displayable, the receiver decodes and displays the newest of the displayable frames.

Generally, frames are displayed without errors because each data packet required for each frame displayed is without detectable error. Accordingly, flawed areas in the displayed moving image are avoided. Further, inter coding can be used without flaws accumulating in a displayed image. The video data packets are relatively small when compared to the data required to represent an entire frame, and usually a retransmitted packet is received in time to display a frame without a delay or a change in the frame rate. Occasionally, display of a frame may be skipped or delayed which reduces or causes jitter in the frame rate of the displayed moving image. However, the change in the frame rate still provides an acceptable moving image for most videophone applications where fast motion and a high frame rate are not required. Additionally, the use of inter coding can improve video compression efficiency and allow a higher maximum frame rate than possible systems using less efficient video compression. The higher maximum frame rate at least partially compensates for loss of frames.

Figure 1:
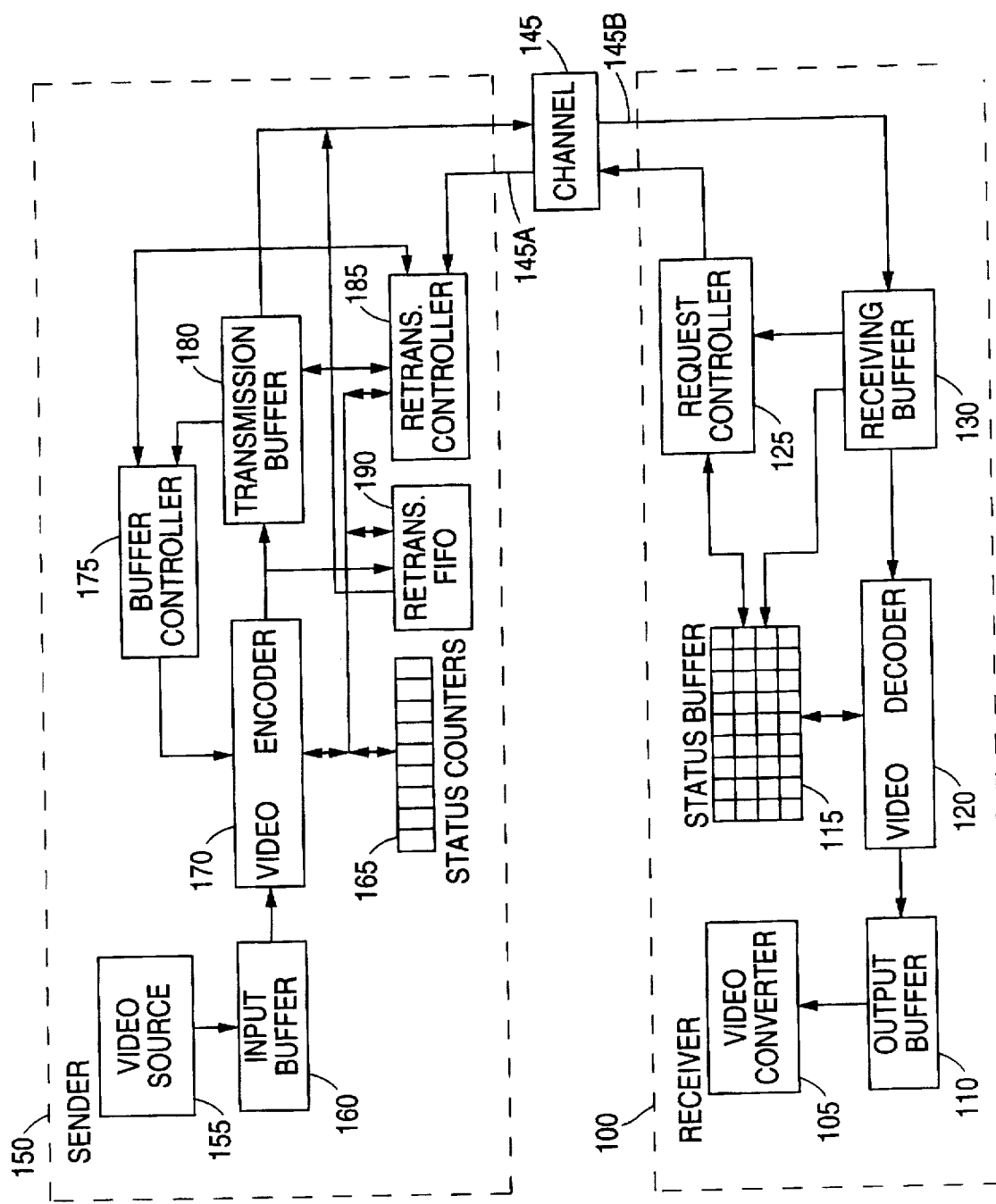
FIG. 1 shows a communication system in accordance with an embodiment of the invention.

FIG. 1 shows a block diagram of a sender 150 and a receiver 100 which communicate via a channel 145. In one embodiment of the invention, one of sender 150 and receiver 100 is in a mobile/wireless videophone, and the other of receiver 100 and sender 150 is in a public switched telephone network (PSTN) videophone. In other embodiments of the invention, sender 150 and receiver 100 are both in mobile/wireless videophones or both in PSTN videophones. FIG. 1 shows the portions of two videophones that are required for one-way video transmission. To allow two-way video transmission over channel 145, each videophone would contain a transmitting portion similar or identical to sender 150 and a receiving portion similar or identical to receiver 100.

Sender 150 receives an input video signal from a video source 155. The input video signal represents a sequence of frames where each frame is a still image. A time index orders the frames, and when displayed in sequence, the frames provide the illusion of an image containing moving objects. Thus, the sequence of frames are referred to herein as a moving image. Sender 150 encodes the moving image and transmits via channel 145 a signal representing the moving image.

In a mobile/wireless or PSTN videophone, video source 155 contains a video camera and an analog-to-digital converter capable of providing a digital signal representing a moving image. An input buffer 160 stores data representing the digital signal from video source 155. Data representing video can have a variety of formats. In one embodiment of the invention, each frame in the moving image is represented by one or more two-dimensional arrays of pixel values which are stored in input buffer 160. Each pixel value in a two-dimensional array represents an intensity, color, or color component for a small area or picture element having a position in a frame corresponding to the position of the pixel value in the two-dimensional array. For example, a frame can be represented by a single two-dimensional array of pixel values wherein each pixel value represents a set of three RGB or YUV color components which identify a color for a corresponding picture element. Alternatively, a frame can be represented by three arrays, one corresponding to each of three color components RGB or YUV.

Figure 2:
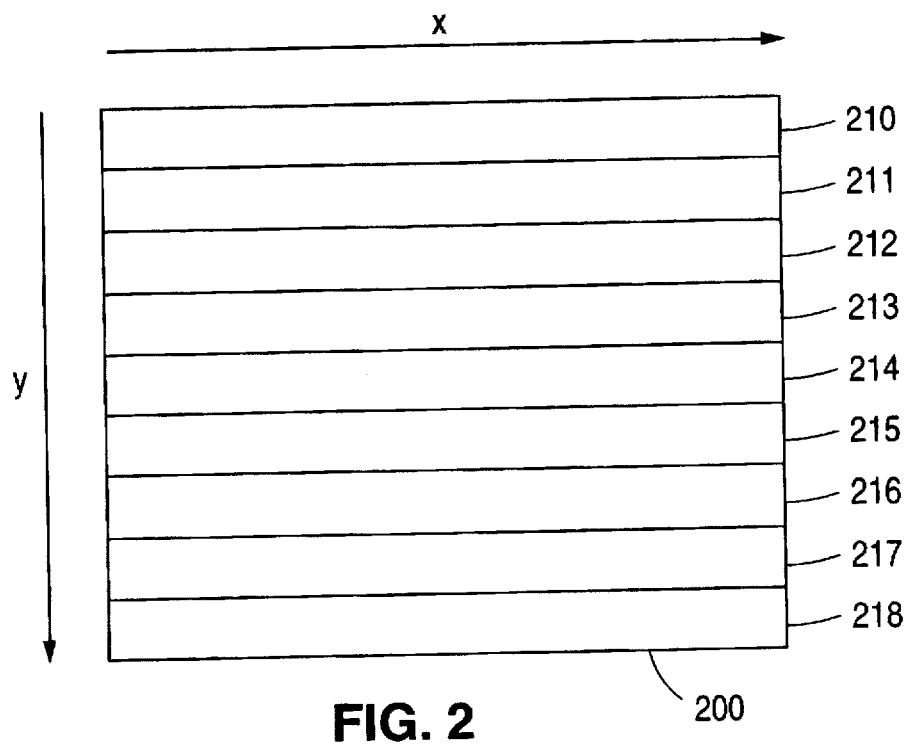
FIG. 2 illustrates a moving image having an image area which is partitioned in accordance with an embodiment of the invention.

FIG. 2 represents an image area 200 for a moving image. Image area 200 contains a two-dimensional array of picture elements (or pixels) which are represented by a two-dimensional array of corresponding pixel values. For example, in a format referred to in the art as QCIF, image area 200 is divided into 176×144 pixels which correspond to x co-ordinates ranging from 0 to 175 and y co-ordinates ranging from 0 to 143.

Figure 3:
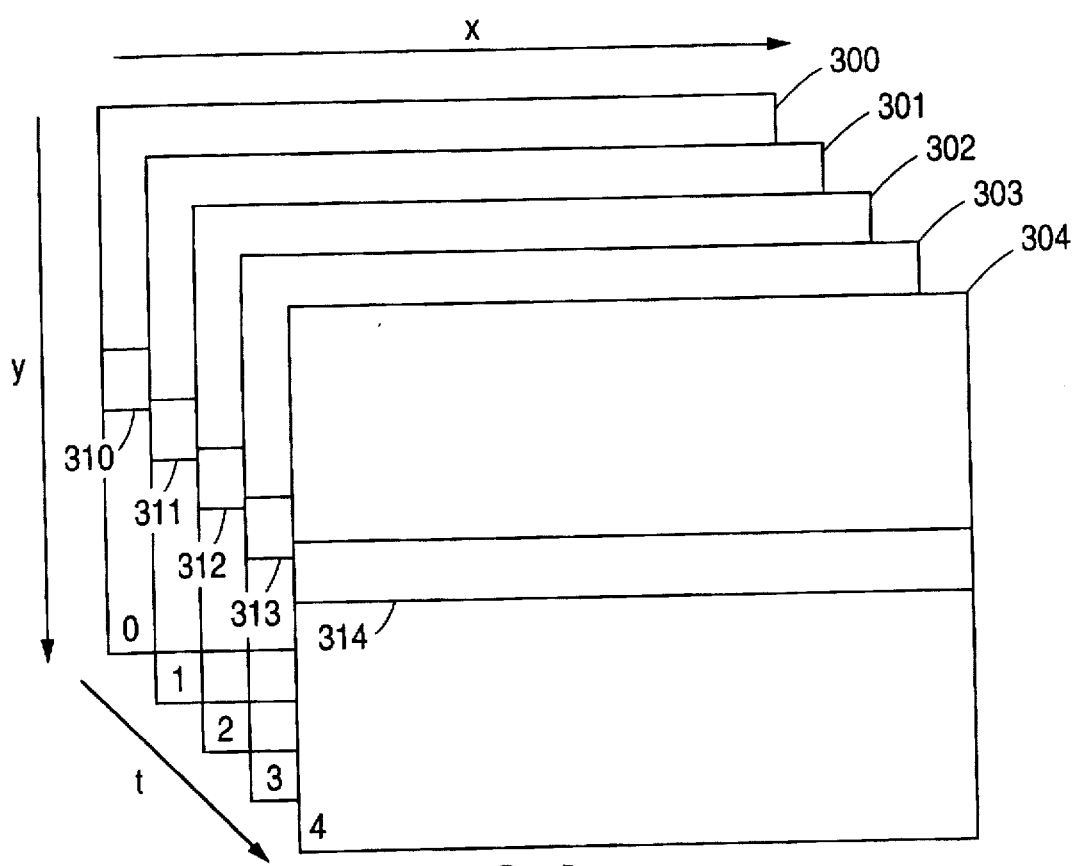
FIG. 3 represents frame segments in frames of a moving image.

A time index t orders the frames of a moving image into a sequence as shown in FIG. 3. For a conventional video camera, the frame rate of a moving image is 30 frames per second. However, for videophones where the available bandwidth for transmission is relatively small, a lower frame rate of about 7 frames per second is typically used. Since display of fast motion is usually not required for videophones, 7 frames/sec provides a moving image with reasonably smooth motion. Sender 150 selects from the input video signals (or from input buffer 160) enough frames to provide a moving image having a desired frame rate. For example, if video source 155 provides 30 frames per second, a video encoder 170 encodes every fourth frame to provide a frame rate of 7.5 frames per second.

In accordance with an embodiment of the invention, a moving image is partitioned into sub-sequences by partitioning the image area of the moving image into regions. FIG. 2 shows an exemplary embodiment where image area 200 is partitioned into nine regions 210 to 218, and the portions of the moving image which correspond to regions 210 to 218 are the sub-sequences of the moving image. In the exemplary embodiment, each region 210 to 218 is a strip as wide (along an x direction) as image area 200 and one ninth the height (along a y direction) of area 200, so that for the QCIF format, each region is 176×16 pixels. Alternatively, any number or shape may be used for the regions which divide a moving image into sub-sequences. FIG. 3 shows frames 300 to 304 which contain frame segments 310 to 314 respectively that are part of a sub-sequence.

Video encoder 170 generates separate digital codes for each frame segment. The coding process encodes the frame segments separately from each other to allow decoding of each sub-sequence without using information from other sub-sequences. In effect, each sub-sequence is an separate moving image for which any video compression process desired may be employed. In one embodiment, video encoder 170 uses a standard video encoding protocol referred to as H.263 which is described in Draft ITU-T Recommendation H.263, entitled "Video Coding For Low Bitrate Communication," Jul. 5, 1995, which is incorporated by reference herein in its entirety.

When encoding a frame segment, video encoder 170 checks status counters 165 to determine if the frame segment should be "intra" coded. Counters 165 are in one-to-one correspondences with the regions that define the sub-sequences and the frame segments. A count in a counter being high indicates a corresponding frame segment should be intra coded to ensure that receiver 100 is not building on data containing errors. Also associated with each counter in counters 165 is a set of status fields which indicates the type of coding used for recently encoded frame segments.

To intra code a frame segment, video encoder 170 uses a still image encoding process to generate a digital code representing the frame segment. In the exemplary embodiment, video encoder 170 partitions the frame segment into macroblocks, where each macroblock has the same size such as 8×8 or 16×16 pixels, and then compresses the macroblock. For example, a discrete cosine transform (DCT) of the pixel values for a macroblock followed by quantization and run length coding typically provides a bit stream which requires less bandwidth to transmit than would all of the pixel values in the macroblock. Compressed data from the macroblocks are combined according to an encoding syntax to form a digital code for the frame segment. The digital code for an intra coded frame segment represents all of the information required for decoding that frame segment. Accordingly, the digital code for an intra coded frame segment refreshes the data used by receiver 100 for a sub-sequence, and any channel errors in previous frames do not affect subsequent decoding.

Inter coding typically provides better compression than does intra coding. To inter code a frame segment, video encoder 170 divides the frame segment into macroblocks, and then performs motion estimation on each macroblock. Motion estimation for a macroblock finds a motion vector which points from the location of the macroblock to the location of a best fit block which is within the corresponding frame segment of the preceding frame. To allow motion vectors and best fit blocks which extend outside the boundaries of a sub-sequence, pixel values for pixels at the edge of the preceding frame segment are repeated to fill in an area of a best fit block which is outside a frame or in another sub-sequence. Accordingly, the best fit block contains only data from a single sub-sequence, and data from other sub-sequences is not used in the motion estimation process.

If a good best fit block is found, pixel values in the best fit block are subtracted from corresponding pixel values in the macroblock to generate a difference block. The difference block is then compressed, for example, by a DCT followed by quantization and run length coding. A resulting digital code for the frame segment indicates the motion vector for the macroblock and the information from the difference block. If a good best fit is not found for a macroblock, that macroblock is intra coded in the same manner as the macroblocks in an intra coded frame segment. Thus, inter coded frame segments can contain inter coded macroblocks and intra coded macroblocks. If all of the macroblocks in a frame segment are intra coded, the frame segment is intra coded.

Each time a frame segment is inter coded, video encoder 170 increments the one of counters 165 which corresponds to the frame segment, by an amount equal to the difference in time indices of successive encoded frames. For example, if every fourth frame from video source 155 is encoded, one of counters 165 is incremented by four each time a frame segment is inter coded. Video encoder 170 resets the corresponding counter each time a frame segment is intra coded. If a count corresponding to a sub-sequence exceeds a threshold $T_{INTRA}$, the next frame segment for the sub-sequence should be intra coded to refresh the data used by receiver 100. Incrementing by an amount proportional to the difference in time indices of encoded frames ensures that the refresh occurs at regular intervals even if sender 150 varies the frame rate.

Typically, intra coding reduces video compression efficiency, and if several frame segments in a frame are intra coded, display of the frame can be delayed because transmission of a bit stream representing the frame takes longer than allowed. Accordingly, if several frame segments of a frame should be intra coded, video encoder 170 can select one or a few of the frame segments for intra coding. Other frame segments can be intra coded in the next frame.

The digital code representing a frame segment is part of the bit stream which is transmitted to receiver 100. Video encoder 170 counts bits generated during encoding and breaks the bit stream for a frame segment into data packets which are shorter than a threshold length $T_{PACKET}$. The packet length affects the chance that a channel error will occur during a transmission, and in one embodiment of the invention, threshold packet length $T_{PACKET}$ is dynamically selected according to an error rate on channel 145. When the error rate is high, threshold length $T_{PACKET}$ is decreased so that the chance of a packet being transmitted without errors remains high, and the output video frame rate at receiver 100 remains above a minimum level (about 3 frames/second) with a frame delay of less than a few hundred milliseconds. When the error rate is low, threshold length $T_{PACKET}$ is increased up to a limit where there is one video data packet per frame segment.

The portion of a frame segment represented by a single data packet is referred to herein as a sub-segment. Typically, each sub-segment contains an integral number of macroblocks. Using an integral number of macroblocks per data packet relates the data packets to definite image areas and allows receiver 100 to track data packets which have been correctly received. The number of macroblocks varies from sub-segment to sub-segment, and the areas of a moving image represented by the sub-segments vary from frame to frame.

Video encoder 170 adds a video header and a cyclic redundancy code (CRC) to each data packet. The header identifies the frame, sub-sequence, and sub-segment described by the packet. In the exemplary embodiment, the video header contains: a start field which contains a unique pattern marking the start of a data packet; a time index field (4 bits) identifying a frame; a sequence number field (4 bits) identifying a sub-sequence so that the combination of the time index and sequence number fields identify a frame segment; a sub-segment start and end fields (8 bits) identifying a sub-segment by numbers of the first and last macroblocks described by the data packet; and a coding process field (1 bit) indicating how the frame segment was encoded (intra or inter coded). In addition to the video header, a Tx header may be added for transmission on channel 145, and information which is in both the video header and the Tx header can be deleted from the video header. Following the video header is the digital code which video encoder 170 generates to describe the sub-segment identified by the video header. The CRC, which receiver 100 uses to detect channel errors in the video data packets, is generated from the digital code. In addition to the CRC, an error correction code can be added to each data packet to provide receiver 100 with error detection and error correction capabilities.

Data packets from video encoder 170 are written to a transmitting buffer 180 and to a first-in-first-out (FIFO) buffer 190. When FIFO buffer 190 overflows, the oldest data packets in FIFO buffer 190 are pushed out to make room for newly encoded data packets. As described below, a retransmission controller 185 determines whether transmission buffer 180 or FIFO buffer 190 provides data for the bit stream which is transmitted to receiver 100 via channel 145. Channel 145 is a two-way channel including a sub-channel 145B for data flow from sender 150 to receiver 100 and a sub-channel 145A for data flow from receiver 100 to sender 150. In the exemplary embodiment, channel 145 is a mobile/wireless channel, and sub-channels 145A and 145B are time multiplexed for video and audio data. Many systems are commercially available which can create wireless/mobile channels such as DECT, GSM, TETRA, and PDC which are suitable for digital video transmission. However, embodiments of the invention can use any type of communication channel and are not limited to mobile/wireless channels.

Receiver 100 contains a receiving buffer 130 which holds data packets from sender 150 and checks the CRC of the data packets to detect errors. The results of the CRC checking is sent to a request controller 125 and to a status buffer 115. Error can also be detected in the data packets when a video decoder 120 parses or decodes all or part of the data packet to identify syntax errors. When a syntax error occurs, video decoder 120 sets an entry in status buffer 115 which is then passed to request controller 125. In the exemplary embodiment, request controller 125 sends a retransmission request to sender 150 only if a data packet contains an error and does not send any message or acknowledgement to sender 150 when a data packet is received without errors. This retransmission strategy is commonly referred to as negative acknowledgments (NAK). In other embodiments of the invention, more complex retransmission strategies such as hybrid automatic repeat requests can be employed.

Before sending a retransmission request, request controller 125 checks status buffer 115 to determine whether the data packet which contained the error is needed. A data packet which has a time index prior to the time index of a displayable frame corresponds to a frame that has been skipped and is therefore not need. A data packet which has a time index prior to the time index of an intra coded frame segment, whether received correctly or not, is not needed because when the intra coded frame segment is correctly received, the sub-sequence is refreshed and the previous data packets are not needed. Request controller 125 does nothing if the data packet is not needed. Otherwise, request controller 125 transmits to sender 150 a request for retransmission of the data packet.

The retransmission request identifies the frame, sub-sequence, and sub-segment described by the data packet containing the error and can, for example, take the same form as the video header for the data packet containing the error. As indicated above, typically sub-channel 145A is time multiplexed for video and audio data, and request controller 125 must compete with an audio system (not shown) and a video transmitter (not shown) for access to channel 145A. Retransmission requests take priority over video data packets which are awaiting transmission.

When sender 150 receives a retransmission request, retransmission controller 185 searches FIFO buffer 190 for the data packet requested. If the requested data packet is found, retransmission controller 185 then checks the status fields for the sub-sequence described by the data packet to determine whether a frame segment in the sub-sequence was intra coded after transmission of the data packet containing the error. If so, retransmission controller 185 ignores the request. Otherwise, the requested data packet is retransmitted from FIFO buffer 190 to receiver 100. The retransmitted data packet has priority over freshly encoded data packets from transmission buffer 180 so that transmission begins immediately following the end of a currently transmitted data packet. The retransmission controller 185 also sets a status flag in status counters 165 to indicate the requested data packet has been retransmitted. If retransmission controller 185 finds that the retransmission is not the first for the requested data packet, retransmission controller 185 requests that video encoder 170 intra code the next frame segment of the sub-sequence represented by the requested data packet. If the requested data packet is not available in FIFO buffer 190, no further retransmission of that data packet occurs. Retransmission controller 185 requests an intra coding of the next frame segment of the sub-sequence represented by the requested data packet.

A round trip delay between request and receipt of a retransmitted data packet consists of processing delays, queuing delays, transmission delays, and propagation delays. The maximum queuing delay at receiver 100 is about equal to the time required to complete transmission of a packet that was begun before the retransmission was requested. Similarly, the maximum queuing delay at sender 150 is about equal to the transmission time for a data packet begun before the requested retransmission. The transmission delay of a requested data packet is also approximately equal to the time required to transmit a data packet. Other delays such as processing delays, transmission delay for a retransmission request (the duration of the retransmission request), and propagation delays (the time for signals to propagate along channel 145) are small when compared to the transmission time of a data packet. Accordingly, the maximum round trip delay is about three times the transmission time for a data packet. If the maximum length of a data packet is 300 bits and channel 145 has a transmission rate of 32,000 bits/second, the maximum delay is about 28 ms. For a maximum data packet length of 800 bits and a transmission rate of 32,000 bits/second, the maximum delay is about 75 ms. For comparison, at 7 frames per second, the interval between frames is about 143 ms, and at 10 frames per second, the interval between frames is about 100 ms. Thus, in the example given, the round trip delay is comparable to the interval between frames.

Request controller 125 sets an entry in status buffer 115 to indicate that a data packet has been received without errors. Status buffer 115 is logically organized into rows and columns of entries for frame segments. Each row contains entries corresponding to frame segments in a frame, i.e. corresponding to a time index in the moving image. Each column contains entries corresponding to frame segments in a sub-sequence of the moving image. In the exemplary embodiment, status buffer 115 contains four rows for four frames and nine columns for nine sub-sequences.

Each individual entry includes a segment status field which has four possible values, (1) nothing received for this frame segment, (2) all packets received correctly and the frame segment is intra coded, (3) all packets received correctly and the frame segment is inter coded, and (4) all other cases. Each entry can also include packet status fields to indicate which data packet or macroblocks have been received correctly and which are still required. For example, if the segment status field has value (4), the packet status fields for received data packets have values "no error", "error", "retransmission requested." Once all packet status fields for a frame segment indicate no error, the segment status field is set to value (2) or (3).

A frame segment is displayable if either the entry corresponding the frame segment has the segment status value (3) or if the entry corresponding the frame segment has the segment status value (2) and the entry corresponding to a frame segment in the same sub-sequence but in the preceding frame is displayable. A frame is displayable if all frame segments in the frame are displayable. Video decoder 120 periodically checks status buffer 115 to determine if any frames are newly displayable. If one or more frames has become displayable since video decoder 120 last checked status buffer 115, video decoder 120 decodes the newest displayable frame to generate an array of pixel values representing a current frame. Decoding requires data packets from receiving buffer 130 and may require previous data which is stored either in an output buffer 110 or receiving buffer 130.

In decoding a frame, video decoder 120 checks each frame segment in the frame to determine whether the frame segment is intra or inter coded. Intra coded frame segments are decoded from the data packets corresponding to the time index of the current frame. Inter coded frame segments are decoded from the previous data and data packets corresponding time indices ranging from the time index following the previous data to the time index of the current frame.

To decode an inter coded frame segment, video coder 120 checks the status entries corresponding to the sub-sequence containing the frame segment. If an entry for a time index between the time index of the current frame and the time index of the previous data indicates that the video sector was intra coded, video decoder decodes the intra coded frame segment and then decodes successive changes in the sub-sequence for the time indices between the intra coding of the frame segment and the time index of the current frame. If all entries corresponding to a sub-sequence indicate inter coding for frame segments, then video coder 120 starts with the previous data for the sub-sequence and then decodes successive changes in the sub-sequence from the data packets corresponding to time indices between the time index of the previous data and the time index of the current frame. Usually, the previous data is a two-dimensional array of pixel values which is stored in output buffer 110 and represents the previous decoded frame. The results of decoding is stored in output buffer 110 and represent the current frame.

When any data packet for a new frame is received, segment status fields in the row of status buffer 115 corresponding to the oldest frame are cleared, i.e. set to status (1), and that row is used for the new frame. A potential loss of information arises if the oldest frame contains one or more sub-sequence for which at least one data packet was never received correctly, and none of the subsequent frames having entries in status buffer 115 are displayable. The frame cleared cannot be decoded to create a current frame because at least one frame segment in the frame is not displayable. If the data packets for the frame are discarded when the status entries are cleared, information required for inter coded frame segments in subsequent frames may be lost. To avoid loss of data, the data packets for the displayable frame segments of the oldest frame can be kept in receiving buffer 130 until a frame having a time index greater than that of the data packet is decoded.

Alternatively, the data packets for the oldest frame which is no longer represented in status buffer 115 can be decoded to generate intermediate data for the displayable frame segments of the oldest frame. The intermediate data is not output through video converter 105, but subsequent decoding of inter coded frame segments can begin with the intermediate data in place of data from the previous frame. The frame segments in the same sub-sequence as the frame segments which were not displayable in the oldest frame cannot be correctly inter decoded because necessary data was never correctly received. However, in accordance with the exemplary embodiment, the second requested for retransmission of a data packet causes a frame segment in a sub-sequence represented by the missing data packet to be intra coded. The intra coded frame segment is displayable because it can be decoded without data from either the previous frame or the intermediate data. Accordingly, the frame containing the intra coded frame segment can be decoded to form an array of pixel values representing the current frame.

The decoded array of pixel values representing the current frame is stored in output buffer 110 from which a video output converter 105 converts the array of pixel values to a usable form. In a videophone, video converter 105 converts the array to a signal which drives a display such as a cathode ray tube or liquid crystal display.

A buffer controller 175 in sender 150 monitors retransmission requests from receiver 100 and adjusts parameters in sender 150 for the current error pattern on channel 145. Three parameters which are dynamically controlled are the maximum packet length $T_{PACKET}$, the frame rate through video encoder 170, and the quantization step size which video encoder 170 uses for quantizing DCT coefficients. If the error rate is high, the maximum packet length $T_{PACKET}$ can be reduced to increase the chance of a data packet arriving error free, the quantization step size can be increased to increase compression efficiency (at the expense of image quality), and the frame rate can be reduced to match the decrease in effective capacity of channel 145. For example, if video source 150 provides 30 frames/second, video encoder 170 can switch from encoding every fourth frame (7.5 frames per second) to encoding every fifth frame (6 frames per second). If the error rate is low, the maximum packet length $T_{PACKET}$ can be increased to decrease overhead for data transmission, the quantization step size can be reduced to improve image quality, and the frame rate can be increased. For example, video encoder 170 can switch from encoding every fourth frame (7.5 frames per second) to encoding every third frame (10 frames per second).

In prior systems which use algebraic error correction, bursts of errors which are fairly common for wireless/mobile channels create uncorrectable errors and result in the display of flawed images. For the system of FIG. 1, bursty error patterns concentrate the errors in a few data packets, so that relatively few retransmissions are required at relatively high error rates. Accordingly, the system of FIG. 1 can easily accommodate bursts of errors.

The operational block shown in FIG. 1 may be implemented in a variety of ways depending on the particular application of the invention. In a stand-alone videophone, receiver 100 and sender 150 can be formed using discrete or integrated components. In one embodiment, one or more application specific integrated circuit (ASIC) implement operational blocks described in reference to FIG. 1. Alternatively, operational blocks such as video decoder 120 and video encoder 170 can be implemented using a digital signal processor (DSP) which executes decoding and encoding software.

A videophone can also be implemented as part of a personal computer which has an input interface for video capture from video source 155 and an output interface for transmission via channel 145. Such interfaces may be provided on a card which attaches to a slot on a local bus of the personal computer. For a videophone implemented in a personal computer, operational blocks such as video decoder 120, request controller 125, video encoder 170, buffer controller 175, and retransmission controller 185 can be implemented in software executed by the main CPU of the computer, and operational blocks such as output buffer 110, status buffer 115, receiving buffer 130, input buffer 160, status counters 165, transmission buffer 180, and FIFO buffer 190 can be formed in the main memory of the computer. Alternatively, the input and/or output interfaces can provide some or all operational blocks in receiver 100 and/or sender 150.

Although the present invention has been described with reference to particular embodiments, the description is only an example of the invention's application and should not be taken as a limitation. In particular, even though much of preceding discussion was aimed at communications on mobile/wireless channels, alternative embodiments of this invention include systems working on hardwired or fiber optic channels. Various other adaptations and combinations of features of the embodiments disclosed are within the scope of the invention as defined by the following claims.

I claim:

1. A method for communicating, the method comprising:

generating a first sequence of frames of a moving image;

spatially partitioning the moving image into a set of sub-sequences, wherein each sub-sequence contains a series of frame segments which are portions of the frames;

encoding each frame segment as a digital code, wherein each digital code is independent of the content of sub-sequences which do not include the frame segment encoded by the digital code; and transmitting a signal representing the digital codes.

2. The method of claim 1, further comprising:

checking each digital code received by a receiver to determine whether any of the digital codes received contains an error;

transmitting from the receiver a request for retransmission of at least a portion of a digital code that when received contained an error;

retransmitting the packet to the receiver;

setting entries in a status buffer to indicate which digital codes the receiver received without an error;

checking the entries to identify a frame for which all digital codes required for decoding the identified frame have been received by the receiver without an error; and decoding the identified frame.

3. The method of claim 2, wherein setting the entries in the status buffer further comprises setting each entry to indicate a coding process for a digital code corresponding to that entry, wherein possible coding processes include inter coding and intra coding.

4. The method of claim 3, wherein checking the entries comprises:

determining that the entries corresponding to the identified frame indicate that all digital codes for the frame have been received without errors; and for each entry which corresponds to the identified frame and indicates the inter coding process for the digital code corresponding to the entry, determining that the receiver has received all digital codes required for decoding a frame segment which is in a preceding frame and in the same sub-sequence as the frame segment corresponding to that entry.

5. The method of claim 2, wherein transmitting a signal representing the digital codes comprises:

dividing each digital code into parts;

forming data packets which represent the parts, wherein the data packets have lengths less than a threshold length and the signal represents the data packets.

6. The method of claim 5, wherein transmitting the signal representing the digital codes further comprises:

generating a cyclic redundancy code for each of the parts of the digital codes; and inserting the cyclic redundancy code for each part in the data packet representing that part.

7. The method of claim 6, wherein checking each digital code comprises checking cyclic redundancy code in each data packet received by the receiver.

8. The method of claim 7, wherein checking each digital code further comprises parsing the digital code to detect syntax errors.

9. The method of claim 2, wherein checking each digital code comprises parsing the digital code to detect syntax errors.

10. The method of claim 1, wherein transmitting a signal representing the digital codes comprises:

dividing each digital code into parts;

forming data packets which represent the parts, wherein the data packets have lengths less than a threshold length and the signal represents the data packets.

11. The method of claim 10, wherein transmitting the signal representing the digital codes further comprises:
generating a cyclic redundancy code for each of the parts of the digital codes; and
inserting the cyclic redundancy code for each part in the data packet representing that part.

12. The method of claim 1, wherein the encoding includes encoding the frame segment to propagate information from a previous frame segment of the same sub-sequence and encoding the frame segment independent of other frame segments.

13. A method for communicating, the method comprising:
determining a threshold length for packets transmitted on a channel which connects a sender to a receiver, wherein the threshold length depends on a pattern of errors on the channel;
generating a first sequence of frames of a moving image;
encoding each frame as a series of digital values;
transmitting a signal from the sender to the receiver via the channel, wherein:
the signal represents sets of packets;
each set of packets corresponds to a frame;
each packet contains digital values from the series for the corresponding frame; and
each packet has a length that is less than the threshold length;
determining whether any of the transmitted packets contain an error when received by the receiver;
sending from the receiver to the sender a request for retransmission of a packet containing an error;
retransmitting the packet from the sender to the receiver; and
converting packets received by the receiver without an error to digital values representing a second sequence of frames.

14. The method of claim 13, wherein determining the threshold length comprises decreasing the threshold length in response to the receiver sending frequent requests for retransmission.

15. The method of claim 13, wherein converting packets comprises skipping data packets corresponding to a frame which is in the first sequence and is partly represented by a data packet which contained an error when received by the receiver.

16. A video encoder comprising:
counters which correspond to regions of a moving image, wherein each counter also corresponds to frame segments which indicate the content of the region which corresponds to that counter; and
an encoding circuit adapted to partition a frame of the moving image into frame segments which correspond to the regions, to select inter coding or intra coding as a coding process for each frame segment, and to use the selected coding process for a frame segment to generate a digital code for that frame, wherein the encoding circuit selects the coding process for each frame segment according to a count in the one of the counters which corresponds to that frame segment.

17. The encoder of claim 16, wherein the encoding circuit further comprises means for incrementing a count each time a corresponding frame segment is inter coded and resetting the count each time the corresponding frame segment is intra coded.

18. The encoder of claim 16, further comprising:
a buffer coupled to the encoding circuit to store data packets representing digital codes; and
a retransmission controller coupled to the buffer to select from the buffer either a current data packet for transmission or a previously transmitted data packet for retransmission.

19. The encoder of claim 18, wherein the buffer comprises a transmission buffer and a retransmission buffer.

20. A video decoder, comprising:
a receiving buffer for data packets which represent portions of frame segments;
a status buffer containing an array of entries, each entry corresponding to a frame segment and indicating whether one or more data packets for that frame segment have been received without an error, wherein a frame segment for which all data packets have been received without an error has a corresponding entry which indicates whether the data packets for the frame segment represent an inter code or an intra code; and
a decoding circuit coupled to the receiving buffer and the status buffer, wherein the decoding circuit decodes a frame after checking the entries in the status buffer and determining the frame is the most recent frame for which all digital packets required for decoding have been received without an error.

21. A method for communicating, comprising the steps of:
generating a first sequence of frames of a moving image;
spatially partitioning the moving image into a set of sub-sequences, wherein each sub-sequence contains a series of frame segments which are portions of the frames;
encoding each frame segment as a digital code, wherein each digital code is independent of the content of sub-sequences which do not include the frame segment encoded by the digital code;
transmitting a signal representing the digital code;
indicating if the digital code is received without an error; and
indicating a coding process for the digital code, wherein possible coding processes include inter coding and intra coding.

* * * * *